June 2, 1925.  1,540,502
C. L. SCHNEIDER ET AL
REMOVABLE DRAWBAR FOR VEHICLES
Filed March 27, 1924    3 Sheets-Sheet 1
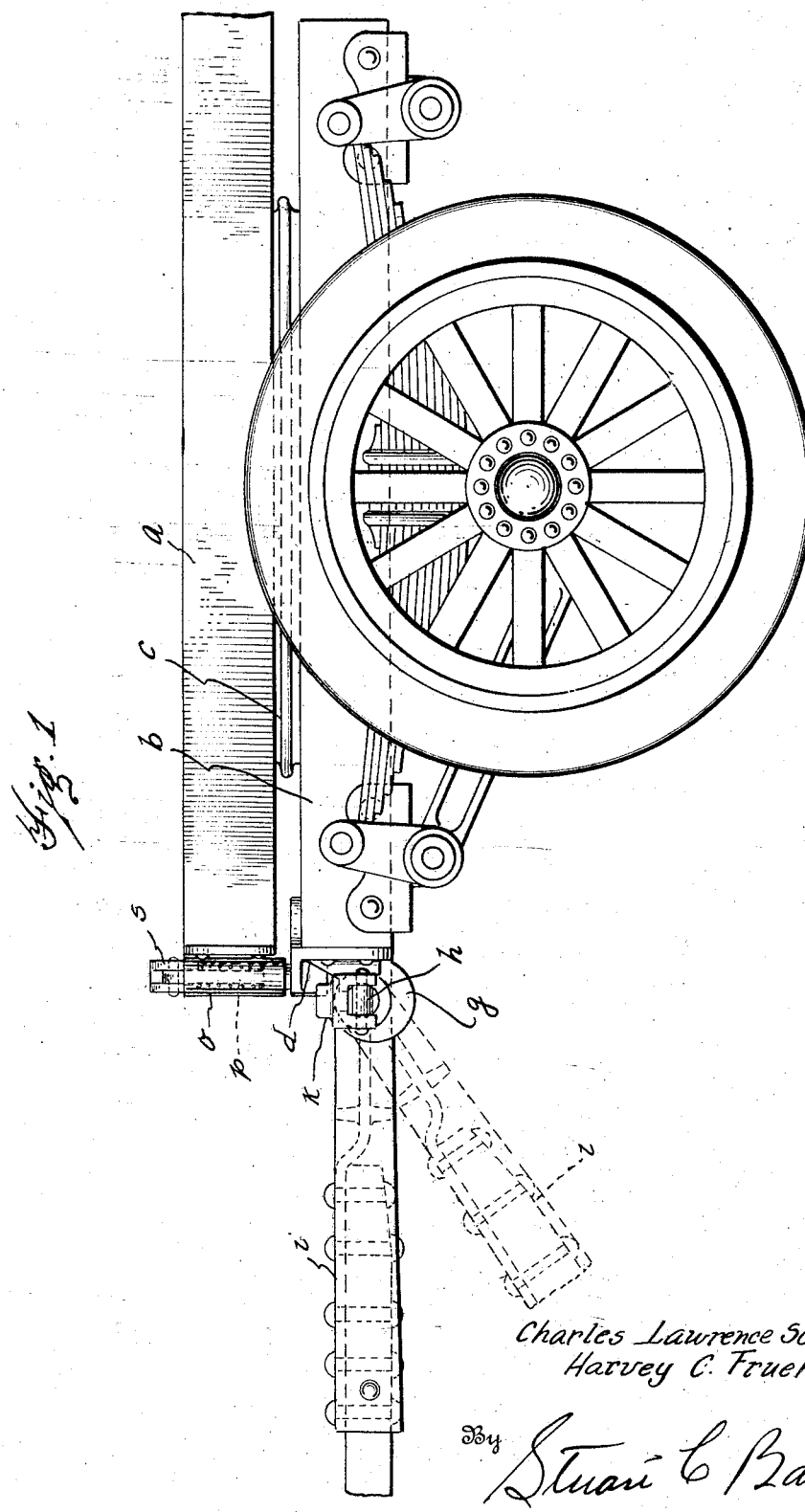
Inventor
Charles Lawrence Schneider
Harvey C. Fruehauf
By Stuart C. Barnes
Attorney

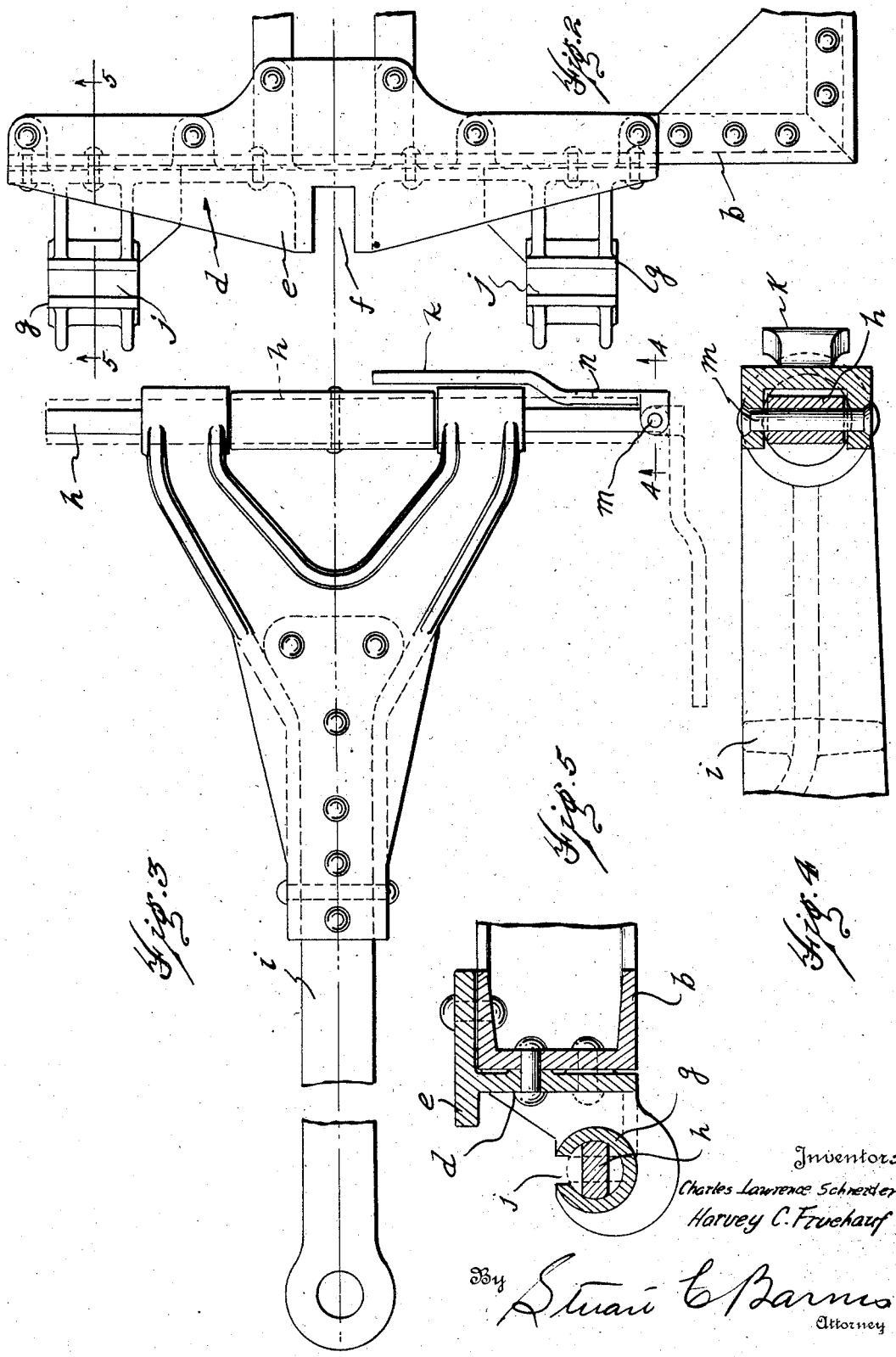

June 2, 1925.

C. L. SCHNEIDER ET AL 1,540,502

REMOVABLE DRAWBAR FOR VEHICLES

Filed March 27, 1924      3 Sheets-Sheet 3

Inventors
Charles Lawrence Schneider
Harvey C. Fruehauf

By Stuart C Barnes
Attorney

Patented June 2, 1925.

1,540,502

UNITED STATES PATENT OFFICE.

CHARLES LAWRENCE SCHNEIDER AND HARVEY C. FRUEHAUF, OF DETROIT, MICHIGAN, ASSIGNORS TO FRUEHAUF TRAILER CO., OF DETROIT, MICHIGAN, A CORPORATION OF MICHIGAN.

REMOVABLE DRAWBAR FOR VEHICLES.

Application filed March 27, 1924. Serial No. 702,217.

*To all whom it may concern:*

Be it known that we, CHARLES LAWRENCE SCHNEIDER and HARVEY C. FRUEHAUF, both citizens of the United States, residing at Detroit, in the county of Wayne and State of Michigan, have invented certain new and useful Improvements in Removable Drawbars for Vehicles, of which the following is a specification.

This invention relates to a trailer construction and more particularly to that class of trailer known as the reversible trailer. It has for its object a provision of means for automatically and centrally locking the swiveling trucks to the trailer frame to prevent relative movement of the swiveling truck. It is also an object to provide means for rendering the locking device ineffective when it is desired to tow the trailer and to allow the steering of the front swiveling truck.

Another feature of the invention is to provide a tongue lock, whereby the trailer may be coupled or uncoupled up to a tractor or another truck so as to allow the trailer to be towed at either end. It is a further object to provide means for locking the tongue in place and prevent the possibility of the trailer becoming uncoupled from the towing unit when in transit.

In such trailer construction, the means for locking the swiveling truck against rotation must be readily released so that when the same is hooked up to the towing unit the trailer may be steered while the back swiveling truck is locked against rotation with respect to the trailer frame. It is necessary for the tongue to be interchangeable so that the towing unit may be readily and easily hooked up to either end of the trailer.

In the drawings:

Fig. 1 is a side elevation of one end of the reversible trailer, showing our improved lock construction.

Fig. 2 is a plan view of one end of the swiveling truck showing the keeper casting secured thereto.

Fig. 3 is a plan view of the tongue for coupling the trailer to the towing unit.

Fig. 4 is a section on the line 4—4 of Fig. 3.

Fig. 5 is a section on the line 5—5 of Fig. 2.

The trailer frame $a$ is provided with the trucks $b$ which have a swiveling connection with the trailer frame through the fifth wheel construction designated $c$. These trucks are supported by the usual running gear.

A keeper casting $d$ is secured to one end of the swiveling truck and it will be noticed by referring to Fig. 2 that the casting is provided with the projecting flange $e$ provided with the slot $f$. Also integrally formed with this casting is a pair of bolt receiving sockets $g$ adapted to receive the revolvable bolts $h$ carried by the tongue $i$. This tongue is adapted to be hooked up to the towing unit (not shown).

Fig. 5 shows the particular construction of this open bolt socket which is provided with the narrow entrance slot $j$ of less width than the diameter of the revolvable bolt $h$. The ends of the bolt $h$ are flattened and when these flattened portions are turned on end they may be slipped into the bolt socket through the narrow entrance slot $j$ and then rotated 90 degrees to prevent the revolvable bolts from becoming disengaged from the bolt sockets carried by the trailer truck.

It is not new to provide a fixed bolt on the tongue, but so far as we know, no tongue has been provided with a revolvable bolt which may be rotated independently of the tongue. These tongues are rather heavy and it has been customary to raise the same up in the air to an inconvenient position at which time the bolt carried thereby may be withdrawn from the hooks. With our improved construction, however, the tongue may rest on the ground and the handle $k$ pivoted to one end of the revolvable bolt as at $m$ may be turned for actuating the revolvable bolt. In Fig. 3, we show the bolt positioned on edge and the handle $k$ closed in. When the revolvable bolt carried by the tongue is slipped into the bolt sockets $g$, the handle $k$ is grasped and moved so as to rotate the revolvable bolt through part of a revolution to a position approximately that shown in Fig. 5. The handle $k$ may be then allowed to close in and that portion designated $n$ will lie in the narrow slot $j$ of the open bolt socket. This will prevent the rotating of the revolvable bolt within the bolt socket and lock the tongue to the trailer so that the same may not become easily disengaged therefrom while in transit.

Figure 6:
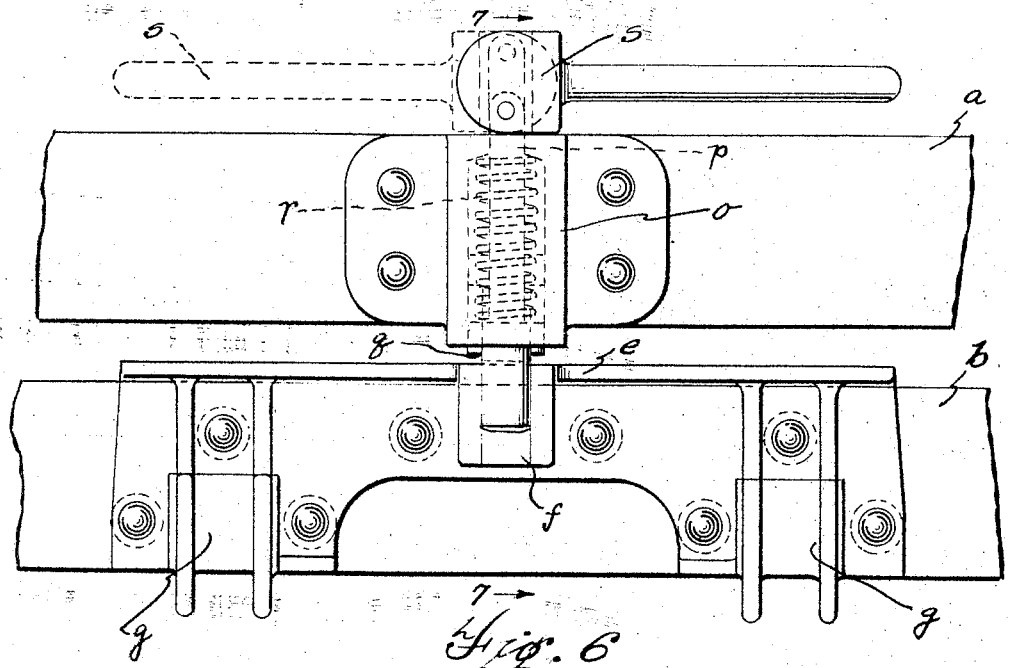
Fig. 6 is a front elevation of the trailer showing our lock construction.
Figure 7:
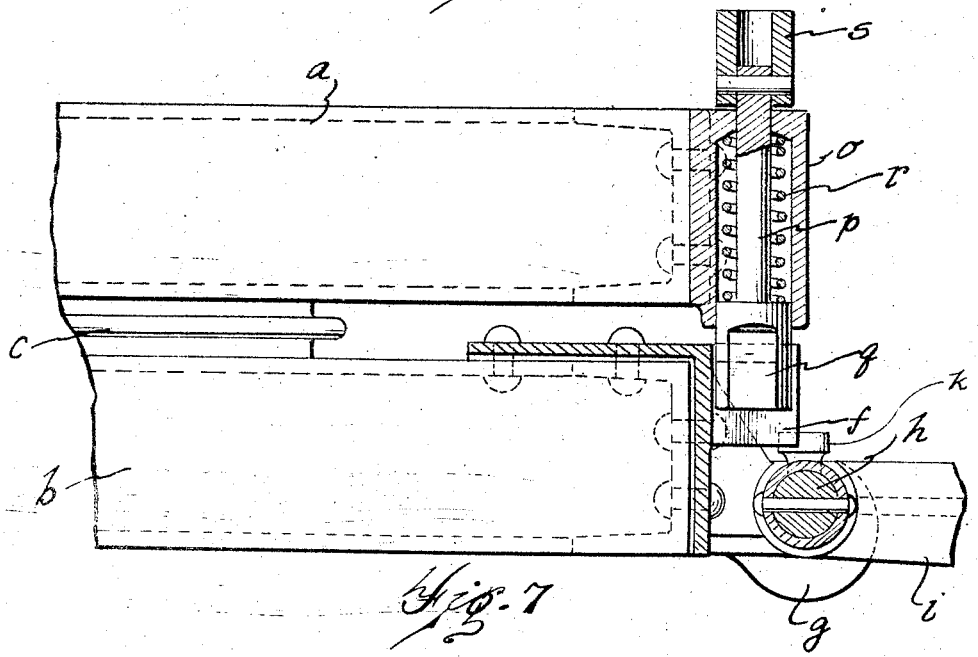
Fig. 7 is a section on the line 7—7 of Fig. 6, showing the swiveling truck locked to the trailer frame and the tongue locked in place.

Carried at each end of the trailer frame is a lock housing $o$ in which is slidably supported the latch bolt $p$. This bolt is flattened at the lower end as at $q$ so that the same may readily fit into the slot $f$ carried by the keeper casting. The upper end of this bolt is reduced in diameter and is extended up through the housing. A coil spring $r$ contained within the housing bears upon the bolt and forces the same downwardly to project the same within the slot $f$ of the keeper casting. The upper end of this bolt is pivotally secured to an eccentric lever $s$. Refer to Fig. 6. As shown in this figure, the eccentric lever is thrown to the right and the latch bolt $p$ is projected into the slot $f$ and the swiveling truck is securely locked to the trailer frame. When the eccentric lever is thrown to the left as shown by the dotted lines in Fig. 6, the latch bolt is raised to the dotted line position; and clears the keeper casting $d$ to allow the truck to freely swivel with respect to the trailer frame. As long as this eccentric lever is positioned in the dotted line position the bolt will be held ineffective and the truck is allowed to swivel freely, but when the lever is thrown to the right, the latch bolt will be projected in the slot $f$ when the truck comes to a central position and the truck is locked to the trailer frame in such position.

Since the trailer frame is provided with one of these latch housings at either end and each swiveling truck is provided with a keeper casting at one end it is possible to couple the trailer to the towing unit at either end. This forms a reversible trailer in which the towing unit may be coupled up to either end of the tractor by a very simple operation. There is no time lost in effecting this hook-up and the trailer parts and the tongue are locked together in such a manner as to avoid any possibility of their becoming unlocked in transit.

What we claim is:

1. A reversible trailer, having in combination a trailer frame, a swiveling truck provided with an open bolt socket having a narrow entrance, a tongue provided with a revolvable lock bolt having a flattened end, said flattened end adapted to pass through the narrow entrance of the open bolt socket in coupling the tongue to the truck, and means for turning said revolvable bolt so as to prevent the same from becoming disengaged from said bolt socket.

2. In a reversible trailer, having in combination a trailer frame, a swiveling truck provided with an open bolt socket having a narrow entrance, a tongue provided with a revolvable locking bolt having a flattened end, the said flattened end adapted to pass through the narrow entrance of the bolt socket to enter the same, means for revolving said revolvable bolt to prevent the same from becoming disengaged from the bolt socket, and means for locking the said revolvable bolt in such locked position.

3. In a reversible trailer, the combination of a trailer frame, a swiveling truck provided with an open bolt socket having a narrow entrance, a tongue provided with a revolvable locking bolt having a flattened end adapted to engage in said bolt socket, a handle pivoted to the revolvable bolt, whereby the bolt may be partially rotated to present the full width of the bolt to the narrow entrance of the bolt socket to prevent the disengagement of the tongue from the truck, the said handle adapted to engage a portion of the bolt socket to prevent the rotation of the revolvable bolt and to hold the same in such locked position.

In testimony whereof we have affixed our signatures.

CHARLES LAWRENCE SCHNEIDER.
HARVEY C. FRUEHAUF.